(12) United States Patent
Shaikh et al.

(10) Patent No.: US 9,448,728 B2
(45) Date of Patent: Sep. 20, 2016

(54) CONSISTENT UNMAPPING OF APPLICATION DATA IN PRESENCE OF CONCURRENT, UNQUIESCED WRITERS AND READERS

(71) Applicant: VMware, Inc., Palo Alto, CA (US)

(72) Inventors: Faraz Shaikh, Sunnyvale, CA (US); Murali Vilayannur, San Jose, CA (US); Satyam B. Vaghani, San Jose, CA (US); Kiran Joshi, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 14/839,163

(22) Filed: Aug. 28, 2015

(65) Prior Publication Data

US 2015/0370489 A1    Dec. 24, 2015

Related U.S. Application Data

(63) Continuation of application No. 13/166,486, filed on Jun. 22, 2011, now Pat. No. 9,146,766.

(51) Int. Cl.
| | |
|---|---|
| *G06F 3/06* | (2006.01) |
| *G06F 17/30* | (2006.01) |
| *G06F 9/455* | (2006.01) |
| *G06F 12/02* | (2006.01) |

(52) U.S. Cl.
CPC ............ *G06F 3/0608* (2013.01); *G06F 3/067* (2013.01); *G06F 3/0631* (2013.01); *G06F 3/0652* (2013.01); *G06F 3/0665* (2013.01); *G06F 9/45533* (2013.01); *G06F 9/45558* (2013.01); *G06F 12/0253* (2013.01); *G06F 12/0261* (2013.01); *G06F 12/0269* (2013.01); *G06F 12/0276* (2013.01); *G06F 17/30138* (2013.01); *G06F 17/30194* (2013.01); *G06F 17/30233* (2013.01); *G06F 2009/45579* (2013.01); *G06F 2212/1044* (2013.01); *G06F 2212/154* (2013.01)

(58) Field of Classification Search
None
See application file for complete search history.

(56) References Cited

U.S. PATENT DOCUMENTS

| | | | |
|---|---|---|---|
| 5,560,003 | A | 9/1996 | Nilsen et al. |
| 5,574,907 | A | 11/1996 | Jernigan, IV et al. |
| 5,692,185 | A | 11/1997 | Nilsen et al. |
| 5,734,861 | A | 3/1998 | Cohn et al. |
| 5,809,295 | A | 9/1998 | Straub et al. |
| 5,819,304 | A | 10/1998 | Nilsen et al. |
| 6,064,811 | A | 5/2000 | Spilo et al. |
| 6,763,446 | B1 | 7/2004 | Kemeny |

(Continued)

OTHER PUBLICATIONS

Seagate, "SCSI Commands Reference Manual", Rev. C, Apr. 2010, pp. 1-446, http://www.seagate.com/staticfiles/support/disc/manuals/Interface%20manuals/100293068c.pdf.*

(Continued)

*Primary Examiner* — Christopher D Birkhimer
(74) *Attorney, Agent, or Firm* — Patterson & Sheridan LLP

(57) ABSTRACT

Free storage blocks previously allocated to a logical block device are released back to an underlying storage system supporting the logical block device in a manner that does not conflict with write operations that may be issued to the free storage blocks at about the same time. According to a first technique, write operations on the same storage blocks to be released are paused until the underlying storage system has completed the releasing operation or, if the write operations are issued earlier than when the underlying storage system actually performs the releasing operation, such storage blocks are not released. According to a second technique, a special file is allocated the free storage blocks, which are then made available for safe releasing.

20 Claims, 10 Drawing Sheets

(56) References Cited

U.S. PATENT DOCUMENTS

| | | |
|---|---|---|
| 7,310,655 B2 | 12/2007 | Dussud |
| 7,328,323 B1 | 2/2008 | Conover |
| 7,395,384 B2 | 7/2008 | Sinclair et al. |
| 7,822,939 B1 | 10/2010 | Veprinsky et al. |
| 7,890,550 B2 | 2/2011 | Jung et al. |
| 7,962,707 B2 | 6/2011 | Kaakani et al. |
| 2006/0253498 A1 | 11/2006 | Barrs et al. |
| 2007/0011415 A1 | 1/2007 | Kaakani et al. |
| 2009/0013128 A1 | 1/2009 | Peterson |

OTHER PUBLICATIONS

Margaret Rouse, Thin Provisioning (TP), Nov. 2006 pp. 1-3, http://searchstorage.techtarget.com/definition/thin-provisioning.

Webopedia, "Virtual Machine"., Dec. 12, 2002, pp. 1-2, http:/web.archive.org/web/20021212145032/http://www.webopedia.com/TERM/V/virtual_machine.html.

Yuval Shavit et al., "Virtual Machine", Jul. 10, 2007, pp. 1-5, http://web.archive.org/web/20110119152931/http://searchservervirtualization.techtarget.com/definitiaon/virtual-machine.

Microsoft, "Garbage Collector Basics and Performance HInts", Apr. 2003, p. 1-8, https://msdn.microsoft.com/en-us/library/ms973837.aspx.

Urs Holzle, "A Fast Write Barrier for Generational Garbage Collection", OOPSLA Garbage Collection Workshop, Oct. 1993, pp. 1-6, http://hoezle.org/publiacations/write-barrier.pdf.

* cited by examiner

CONSISTENT UNMAPPING OF APPLICATION DATA IN PRESENCE OF CONCURRENT, UNQUIESCED WRITERS AND READERS

CROSS-REFERENCE TO RELATED APPLICATIONS

This application is a continuation of U.S. patent application Ser. No. 13/166,486, filed Jun. 22, 2011 (now U.S. Pat. No. 9,146,766), which is incorporated by reference herein in its entirety.

BACKGROUND

Computer virtualization is a technique that involves encapsulating a physical computing machine platform into a virtual machine that is executed under the control of virtualization software on a hardware computing platform, or "host." A virtual machine has both virtual system hardware and guest operating system software. Virtual system hardware typically includes at least one "virtual disk," a single file or a set of files that appear as a typical storage drive to the guest operating system. The virtual disk may be stored on the host platform or on a remote storage device. Typically, a virtual machine (VM) uses the virtual disk in the same manner that a physical storage drive is used, to store the guest operating system, application programs, and application data.

The virtualization software, also referred to as a hypervisor, manages the guest operating system's access to the virtual disk and maps the virtual disk to the underlying physical storage resources that reside on the host platform or in a remote storage device, such as a storage area network (SAN) or network attached storage (NAS). Because multiple virtual machines can be instantiated on a single host, allocating physical storage space for virtual disks corresponding to every instantiated virtual machine in an organization's data center can stress the physical storage space capacity of the data center. For example, when provisioning a virtual disk for a virtual machine, the virtualization software may allocate all the physical disk space for the virtual disk at the time the virtual disk is initially created, sometimes creating a number of empty data blocks containing only zeros ("zero blocks"). However, such an allocation may result in storage inefficiencies because the physical storage space allocated for the virtual disk may not be timely used (or ever used) by the virtual machine. In one solution, known as "thin provisioning," virtualization software dynamically allocates physical storage space to a virtual disk only when such physical storage space is actually needed by the virtual machine and not necessarily when the virtual disk is initially created.

However, even with the use of thinly-provisioned virtual disks, storage inefficiencies may be further caused by an accumulation of "stale" data in the virtual disk, i.e., disk blocks that were previously used but are currently unused by the guest operating system. For example, deletion of a file, such as a temporary file created as a backup during editing of a document, in the virtual disk by the guest operating system does not generally result in a release of the actual data blocks corresponding to the temporary file. While the guest operating system may itself track the freed data blocks relating to the deleted temporary file in its own guest file system (e.g., by clearing bits in a bitmap for the guest file system), the guest operating system is not aware that the disk on which it has deleted the temporary data file is actually a "virtual disk" that is itself a file. The file is stored in a "virtual machine" level file system (hereinafter sometimes referred to as a "VMFS" or "virtual machine file system") that is implemented and imposes an organizational structure in a logical unit number (LUN) of a storage device. Therefore, although a portion (i.e., the portion of the virtual disk that stores the guest file system's bitmap of freed data blocks) of the virtual disk may be modified upon a deletion of the temporary file by the guest operating system, the portion of the virtual disk corresponding to actual data blocks of the deleted temporary file does not actually get released from the virtual disk back to the LUN by the virtual machine file system. This behavior can result in storage inefficiencies because such "stale" portions of the virtual disk are not utilized by the corresponding guest operating system and are also not available to the virtual machine file system for alternative uses (e.g., reallocated as part of a different virtual disk for a different virtual machine, etc.).

SUMMARY

One or more embodiments of the present invention provide techniques for releasing free storage blocks previously allocated to a logical block device back to an underlying storage system supporting the logical block device. In one embodiment, the logical block device is a virtual disk that has been provisioned to a virtual machine, and the virtual machine identifies free storage blocks to be released.

A method for releasing free storage blocks previously allocated to a logical block device back to an underlying storage system supporting the logical block device, according to an embodiment of the present invention, includes the steps of: receiving a notification from a first process of a processing entity accessing the logical block device of an intent to request a release of a set of storage blocks that are currently allocated to the logical block device but that are not being used by the logical block device, wherein the notification identifies an initial set of storage blocks to be released; intercepting a write operation from a second process of the processing entity; determining that the write operation corresponds to a subset of the initial set of storage blocks; issuing the write operation to the logical block device; receiving from the first process a request to release a set of storage blocks from the logical block device, wherein the request identifies an updated set of storage blocks; and releasing storage blocks in the updated set that are not in the subset of storage blocks corresponding to the write operation.

A method for issuing a command to release free storage blocks previously allocated to a logical block device back to an underlying storage system supporting the logical block device, according to an embodiment of the present invention, includes the steps of: identifying a set of free blocks to be released; updating the set of free blocks to remove those free blocks that have already been released; allocating the free blocks in the updated set to a file; and issuing a command to release the free blocks allocated to the file.

Embodiments of the present invention further include a non-transitory computer-readable storage medium storing instructions that when executed by a computer system cause the computer system to perform one or more of the methods set forth above, and a computer system that is configured to carry out one or more of the methods set forth above.

DETAILED DESCRIPTION

Figure 1:
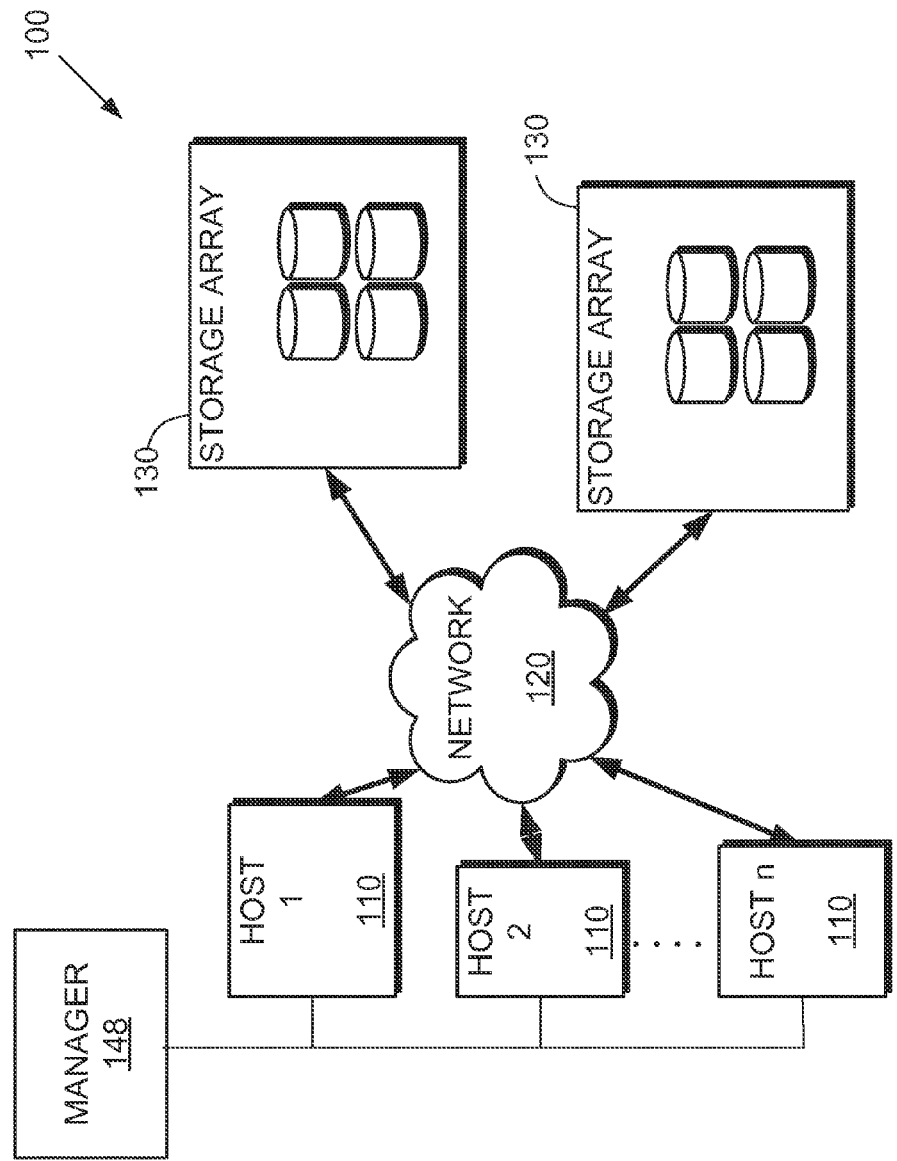
FIG. 1 is a block diagram that shows a virtualized computer architecture according to one or more embodiments.

FIG. 1 is a block diagram that shows a virtualized computer architecture 100 according to one or more embodiments. Virtualized computer architecture 100 includes a plurality of servers 110 connected through network 120 to a shared storage system that includes one or more storage arrays 130. There may be any number of servers 110, each of which may comprise a general purpose computer system having one or more virtual machines accessing data stored on any number of storage arrays 130. Network 120 may be a wide area network, a local area network, or a network hosting a protocol especially suited for storage arrays 130, such as Fibre Channel, iSCSI, HyperSCSI, etc., and may comprise one or more of Fibre Channel switches. Storage arrays 130 may be of any type such as a network-attached storage (NAS) filer or a block-based device over a storage area network (SAN). While storage arrays 130 are typically made up of a plurality of disks, it should be recognized that as prices for solid-state non-volatile storage devices fall, they are increasingly taking the place of rotating disk storage media. The use of the term, "disk" herein, should therefore not be construed as limited only to rotating disk storage media, but also what is become known as solid state disks, or "SSDs."

Virtualized computer architecture 100 is managed by a manager 148, which is a computer program that resides and executes in a central server or alternatively, in one of servers 110. Manager 148 is in communication with each of servers 110, and carries out administrative tasks for virtualized computer architecture 100 such as load balancing between servers 110 and workload balancing between storage arrays 130.

Figure 2A:
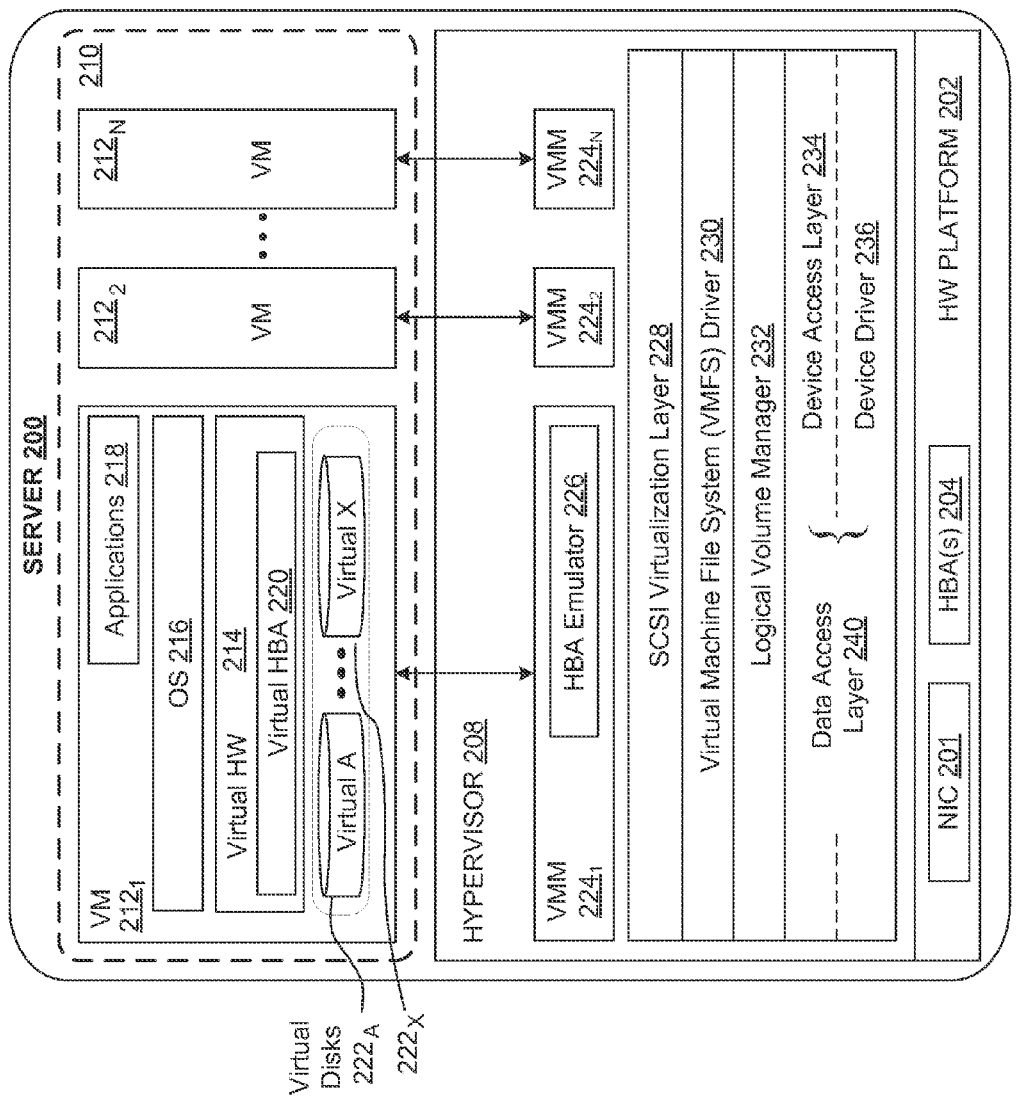
FIG. 2A depicts a block diagram representive of a server in the virtualized computer architecture of FIG. 1, according to one or more embodiments.
Figure 2B:
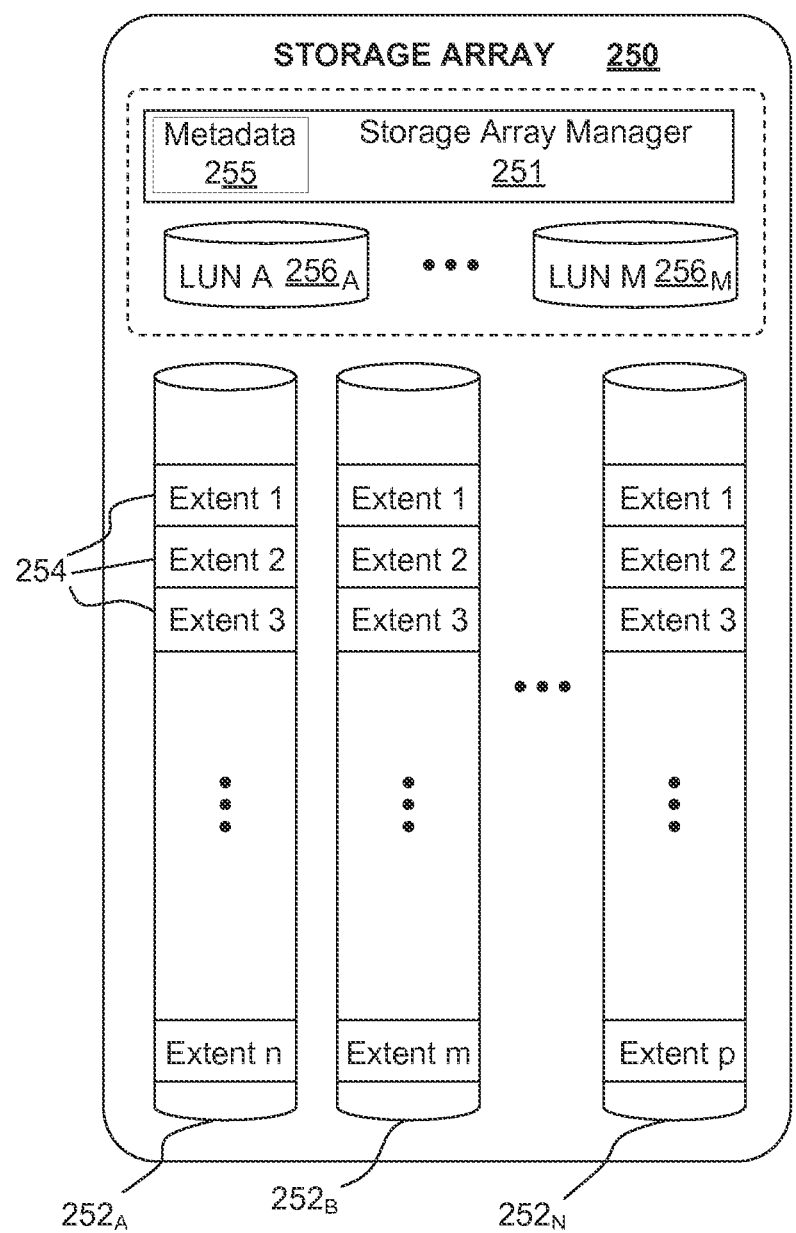
FIG. 2B depicts block diagram representative of a storage array in the virtualized computer architecture of FIG. 1, according to one or more embodiments.

FIGS. 2A and 2B respectively depict block diagrams of a server 200 that is representative of any of servers 110 and a storage array 250 that is representative of any of storage arrays 130, according to one or more embodiments. Server 200 may be constructed on a conventional, typically server-class, hardware platform 202. As shown in FIG. 2A, server 200 includes HBAs 204 and NIC 201 that enable server 200 to connect to storage array 250. As further shown in FIG. 2A, hypervisor 208 is installed on top of hardware platform 202 and it supports a virtual machine execution space 210 within which multiple virtual machines (VMs) $212_1$-$212_N$ may be concurrently instantiated and executed. Each such virtual machine $212_1$-$212_N$ implements a virtual hardware platform 214 that supports the installation of a guest operating system 216 which is capable of executing applications 218. Examples of a guest operating system 216 include any of the well-known commodity operating systems, such as Microsoft Windows, Linux, and the like. In each instance, guest operating system 216 includes a native file system layer (not shown in FIG. 2A), for example, either an NTFS or an ext3FS type file system layer. These file system layers interface with virtual hardware platforms 214 to access, from the perspective of guest operating systems 216, a data storage HBA, which in reality, is virtual HBA 220 implemented by virtual hardware platform 214 that provides the appearance of disk storage support (in reality, virtual disks or virtual disks $222_A$-$222_X$) to enable execution of guest operating system 216 transparent to the virtualization of the system hardware. In certain embodiments, virtual disks $222_A$-$222_X$ may be thinly provisioned and appear to support, from the perspective of guest operating system 216, the SCSI standard for connecting to the virtual machine or any other appropriate hardware connection interface standard known to those with ordinary skill in the art, including IDE, ATA, and ATAPI.

Although, from the perspective of guest operating systems 216, file system calls initiated by such guest operating systems 216 to implement file system-related data transfer and control operations appear to be routed to virtual disks $222_A$-$222_X$ for final execution, in reality, such calls are processed and passed through virtual HBA 220 to adjunct virtual machine monitor (VMM) layers $224_A$-$224_N$ that implement the virtual system support needed to coordinate operation with hypervisor 208. In particular, HBA emulator 226 functionally enables the data transfer and control operations to be correctly handled by hypervisor 208 which ultimately passes such operations through its various layers to true HBAs 204 or NIC 201 that connect to storage array 250. Assuming a SCSI supported virtual device implementation (although those with ordinary skill in the art will recognize the option of using other hardware interface standards), SCSI virtualization layer 228 of hypervisor 208 receives a data transfer and control operation (in the form of SCSI commands, for example, intended for a SCSI-compliant virtual disk) from VMM layers $224_A$-$224_N$, and converts them into file system operations that are understood by virtual machine file system (VMFS) 230 in order to access a file stored in one of the LUNs in storage array 250 under the management of VMFS 230 that represents the SCSI-compliant virtual disk. In one embodiment, the file representing the virtual disk conforms to the .vmdk file format promulgated by VMware, Inc. for virtual disks, although it should be recognized that alternative virtual disk file formats may be used in other embodiments.

SCSI virtualization layer 228 then issues these file system operations to VMFS 230. VMFS 230, in general, manages creation, use, and deletion of files (e.g., such as . vmdk files representing virtual disks) stored on LUNs exposed by storage array 250. One example of a clustered file system that can serve as VMFS 230 in an embodiment is described in U.S. Pat. No. 7,849,098, entitled "Multiple Concurrent Access to a File System," filed Feb. 4, 2004 and issued on Dec. 7, 2010, the entire contents of which are incorporated by reference herein. VMFS 230, converts the file system operations received from SCSI virtualization layer 228 to volume (e.g. LUN) block operations, and provides the volume block operations to logical volume manager 232. Logical volume manager (LVM) 232 is typically implemented as an intermediate layer between the driver and file system layers, and supports volume oriented virtualization and management of the LUNs accessible through HBAs 204 and NIC 201. LVM 232 issues raw SCSI operations to device access layer 234 based on the LUN block operations. Device access layer 234 discovers storage array 250, and applies command queuing and scheduling policies to the raw SCSI operations. Device driver 236 understands the input/output interface of HBAs 204 and NIC 201 interfacing with storage array 250, and sends the raw SCSI operations from device access layer 234 to HBAs 204 or NIC 201 to be forwarded to storage array 250.

It should be recognized that the various terms, layers and categorizations used to describe the virtualization components in FIG. 2A may be referred to differently without departing from their functionality or the spirit or scope of the invention. For example, VMMs 224 may be considered separate virtualization components between VMs 212 and hypervisor 208 (which, in such a conception, may itself be considered a virtualization "kernel" component) since there exists a separate VMM for each instantiated VM. Alternatively, each VMM may be considered to be a component of its corresponding virtual machine since such VMM includes the hardware emulation components for the virtual machine. In such an alternative conception, for example, the conceptual layer described as virtual hardware platform 214 may be merged with and into VMM 224 such that virtual host bus adapter 220 is removed from FIG. 2A (i.e., since its functionality is effectuated by host bus adapter emulator 226).

Storage array manager 251 of storage array 250, as depicted in FIG. 2B, receives the raw SCSI operations corresponding to one of its LUNs and resolves them into the appropriate extents within the spindles of storage array 250 that are operated upon. Storage array manager 251, which represents one or more programmed storage processors, generally serves as a communication agent (to the outside world) for storage array 250, and implements a virtualization of physical, typically disk drive-based storage units, referred to in FIG. 2B as spindles $252_A$-$252_N$, that reside in storage array 250. From a logical perspective, each of these spindles can be thought of as a sequential array of fixed sized extents 254. Storage array manager 251 abstracts away complexities of targeting read and write operations to addresses of the actual spindles and extents of the disk drives by exposing to server 200 an ability to view the aggregate physical storage space provided by the disk drives as a contiguous logical storage space that may be divided into a set of virtual SCSI block devices previously referred to herein as LUNs $256_A$-$256_M$ ("Logical Unit Numbers"). The virtualization of spindles $252_A$-$252_N$ into such a contiguous logical storage space of LUNs $256_A$-$256_M$ can provide a more efficient utilization of the aggregate physical storage space that is represented by an address space of a logical volume. Storage array manager 251 maintains metadata 255 that includes a mapping (hereinafter, also referred to as an extent-mapping) for each of LUNs $256_A$-$256_M$ to an ordered list of extents, wherein each such extent can be identified as a spindle-extent pair <spindle #, extent #> and may therefore be located in any of the various spindles $252_A$-$252_N$.

In certain embodiments, storage array 250 may employ a storage space optimization technology called "thin provisioning" when allocating LUNs. When a LUN is "thinly" provisioned, the logical size of the LUN as reported by storage array 250 may be larger than the amount of physical space initially backing that LUN. All consumers of the LUN only see the logical size of the LUN. As write operations are issued to previously unallocated blocks of a thin-provisioned LUN, the amount of actual physical space consumed grows, and at some point, the LUN runs out of physical space. In a similar fashion, in a virtualization environment such as that depicted in FIG. 2A, a virtual disk $222_A$ stored on a LUN of storage array 250 may be configured to be "thinly provisioned," for example, by hypervisor 208 (or by manager 148 in certain embodiments). From the perspective of guest operating system 216, such a thinly-provisioned virtual disk $222_A$ would be perceived as having a fixed logical size, but, in reality, VMFS 230 allocates LUN storage space to virtual disk $222_A$ (e.g., a .vmdk file) dynamically, such that at any given time, the actual storage space in the LUN that backs virtual disk $222_A$ may be less than the logical size.

Figure 3:
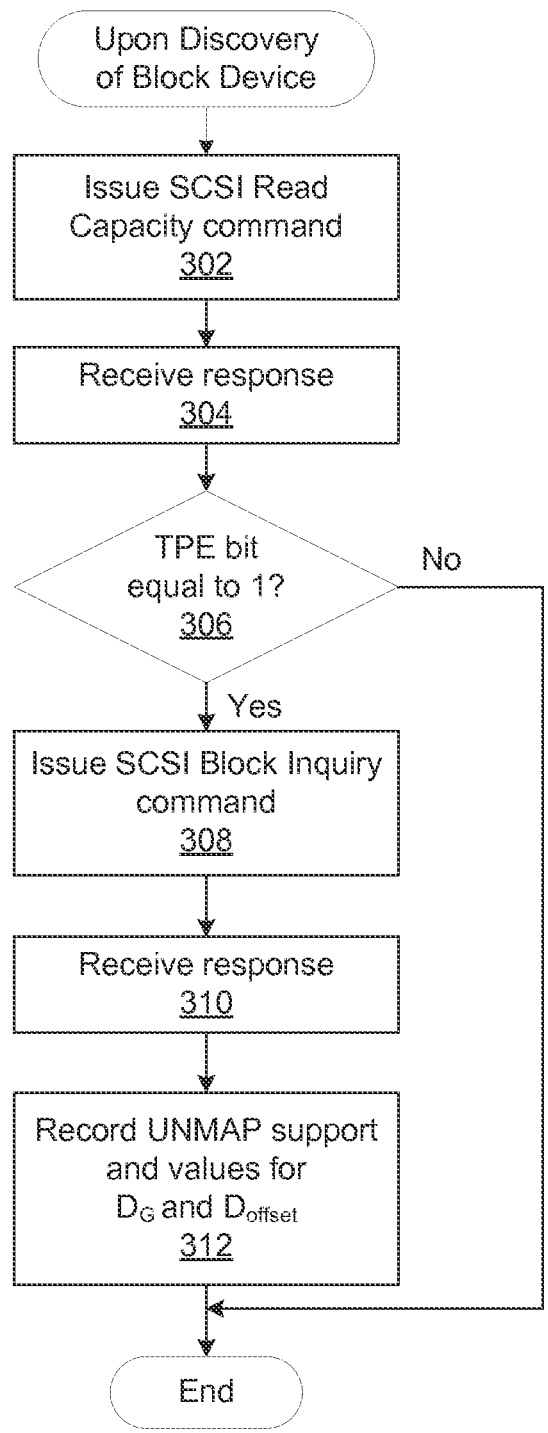
FIG. 3 is a flow diagram illustrating a method to collect configuration characteristics of a block device that may be used to reclaim storage space, according to an embodiment.

FIG. 3 is a flow diagram that illustrates a method carried out by a computer system to collect configuration characteristics of a block device. These configuration characteristics of the block device may be used in techniques described below to "reclaim" storage space from the block device (back to a storage system supporting the block device) by issuing an "UNMAP" command to the block device. For example, in one embodiment, the block device may be a thinly provisioned LUN exposed by a SAN. In other embodiments, as further detailed herein, the block device may be a thinly provisioned virtual disk $222_A$ backed by storage space of a LUN (e.g., stored as a .vmdk file on the LUN) and the computer system collecting the configuration characteristics is virtual machine $212_1$. In such embodiments, VMFS 230 of hypervisor 208, which manages thinly-provisioned virtual disk $222_A$ as stored on the LUN, may be able to "release" a certain amount of storage space it previously allocated to virtual disk $222_A$ back to the LUN if virtual disk $222_A$ is no longer using such storage (e.g., such storage corresponds to free file system level data blocks as managed by the guest file system of guest operating system 216 of virtual machine $212_1$, etc.). Because virtual disk $222_A$ is thinly-provisioned, if the guest file system of guest operating system 216 needs to allocate additional file system level data blocks to a file, VMFS 230 will dynamically allocate LUN storage space back to virtual disk $222_A$ at such time.

As depicted in FIG. 3, at step 302, the computer system (e.g., guest operating system 216 or an application 218 in virtual machine $212_1$ in one embodiment) issues a SCSI Read Capacity command (e.g., 16 bit version of the command) to a block device (e.g., a SCSI-compliant, thinly provisioned virtual disk $222_A$). The response of the block device, received at step 304, includes an indication of whether or not the block device has been thinly provisioned as indicated by the setting of a thin provisioning enabled (TPE) bit. If, at step 306, the computer system determines the TPE bit as being set, the method continues on to step 308. If, at step 306, the computer system determines the TPE bit as not being set, the method ends.

At step 308, the computer system issues a SCSI Block Inquiry command (e.g., utilizing the 0xB0 or "Virtual Product Data" code as the type of inquiry in one embodiment) to the block device. The response of the block device, received at step 310 and recorded at step 312, includes an indication of whether or not the block device supports an "UNMAP" command and, if there is support, the response also includes a report of several parameters to be used with UNMAP commands that are to be issued to the block device. In its simplest form, in one embodiment, an UNMAP command specifies a list of blocks that are to be unmapped by the block device and released to the underlying storage system supporting the block device. In one such embodiment, the parameters reported include $D_G$, a granularity at which the block device manages data, $D_{offset}$, an alignment parameter expressed at an offset at which the block device prefers to receive UNMAP commands, and $N_{MAX}$, a maximum number of <offset, length> pairs that can be specified with a single UNMAP command. It should be recognized that in embodiments where the block device described above is virtual disk $222_A$, the values $D_G$, and $D_{offset}$ represent the granularity and the offset for virtual disk $222_A$ (e.g., as initially configured or set by hypervisor 208 or manager 148 as an emulated SCSI-compliant device). In contrast, in embodiments where the block device described above is a LUN, the values $D_G$, and $D_{offset}$ are set or defined, instead, by the storage vendor. It should be recognized that in embodiments, where both virtual disk $222_A$ and the LUN in which it resides are thinly provisioned and support UNMAP commands, their respective $D_G$, and $D_{offset}$ values may not necessarily match the $D_G$, and $D_{offset}$ values of the other.

Figure 4:
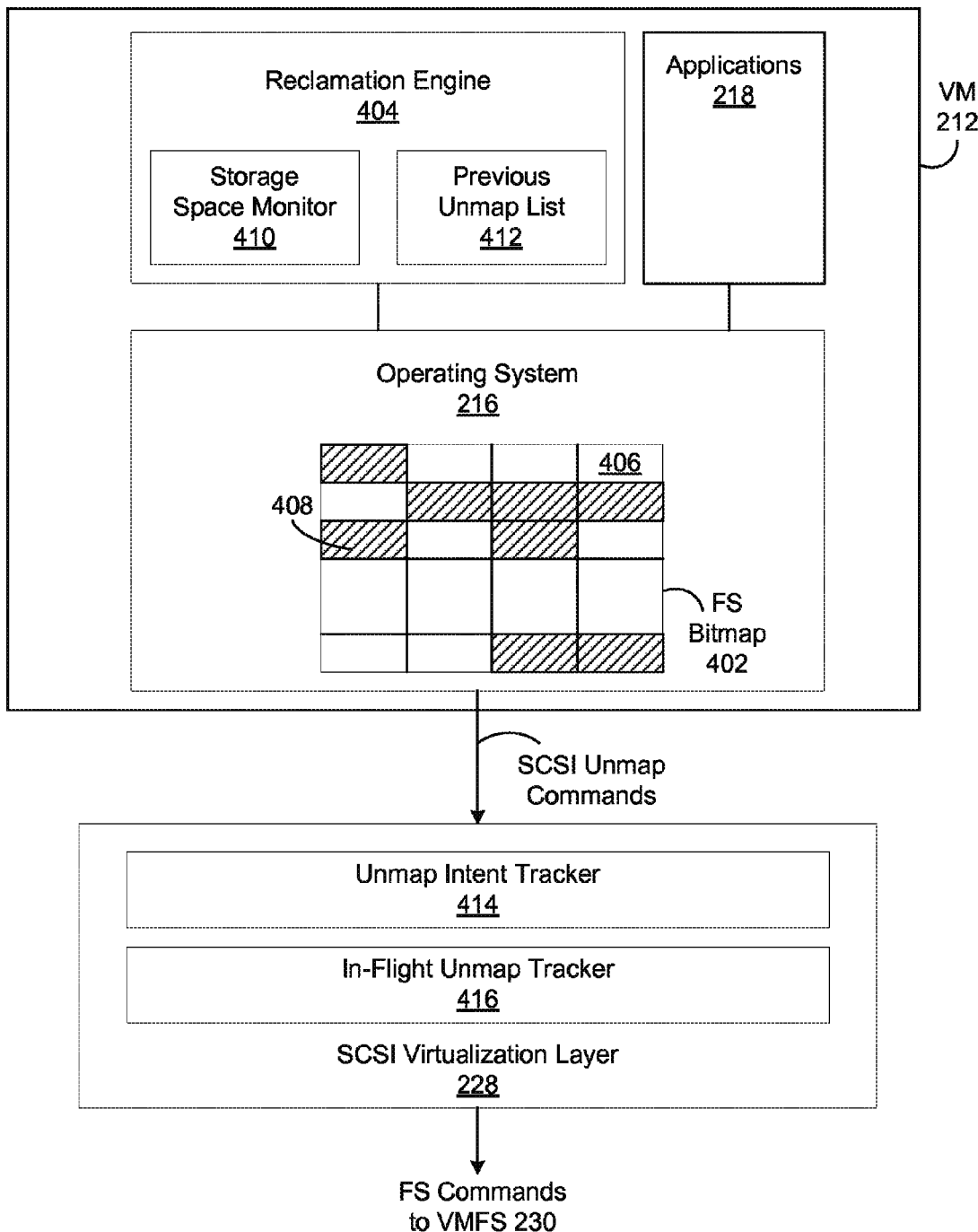
FIG. 4 illustrates a diagram of a reclamation engine within a virtual machine, according to an embodiment.
Figure 5:
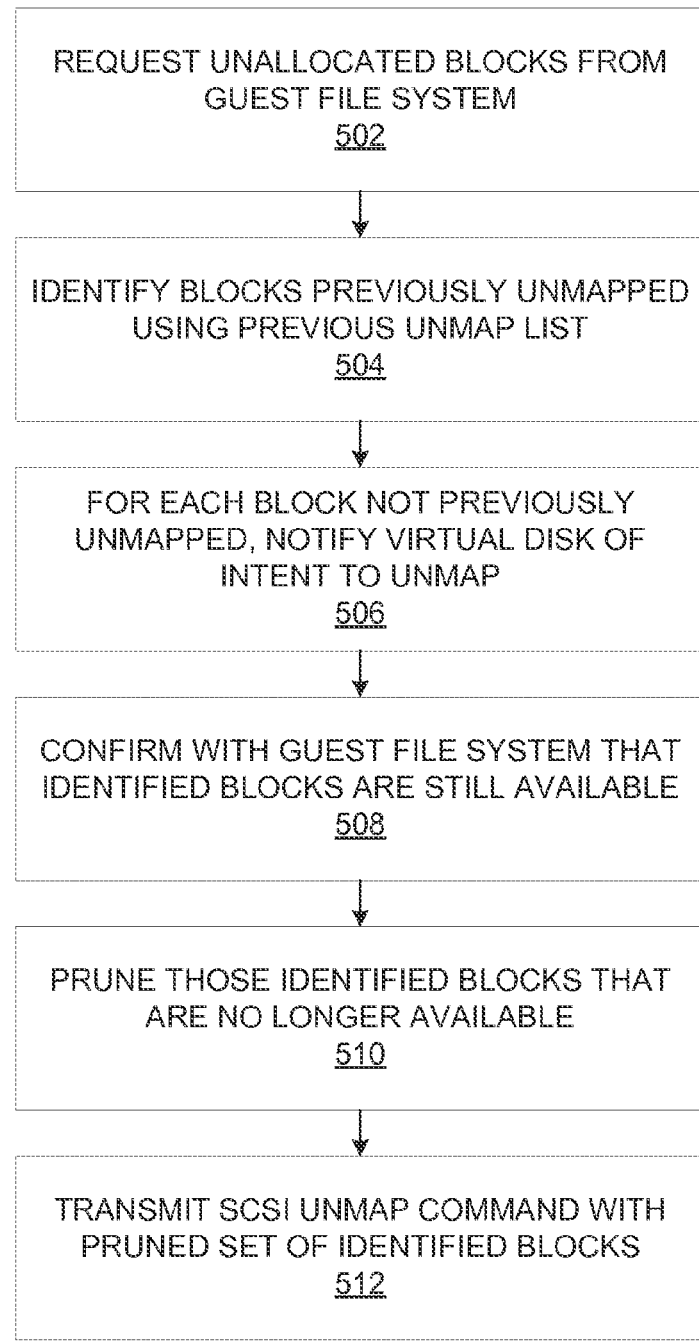
FIG. 5 is a flow diagram that illustrates a method of storage space reclamation that is initiated by a virtual machine, according to one embodiment.
Figure 7:
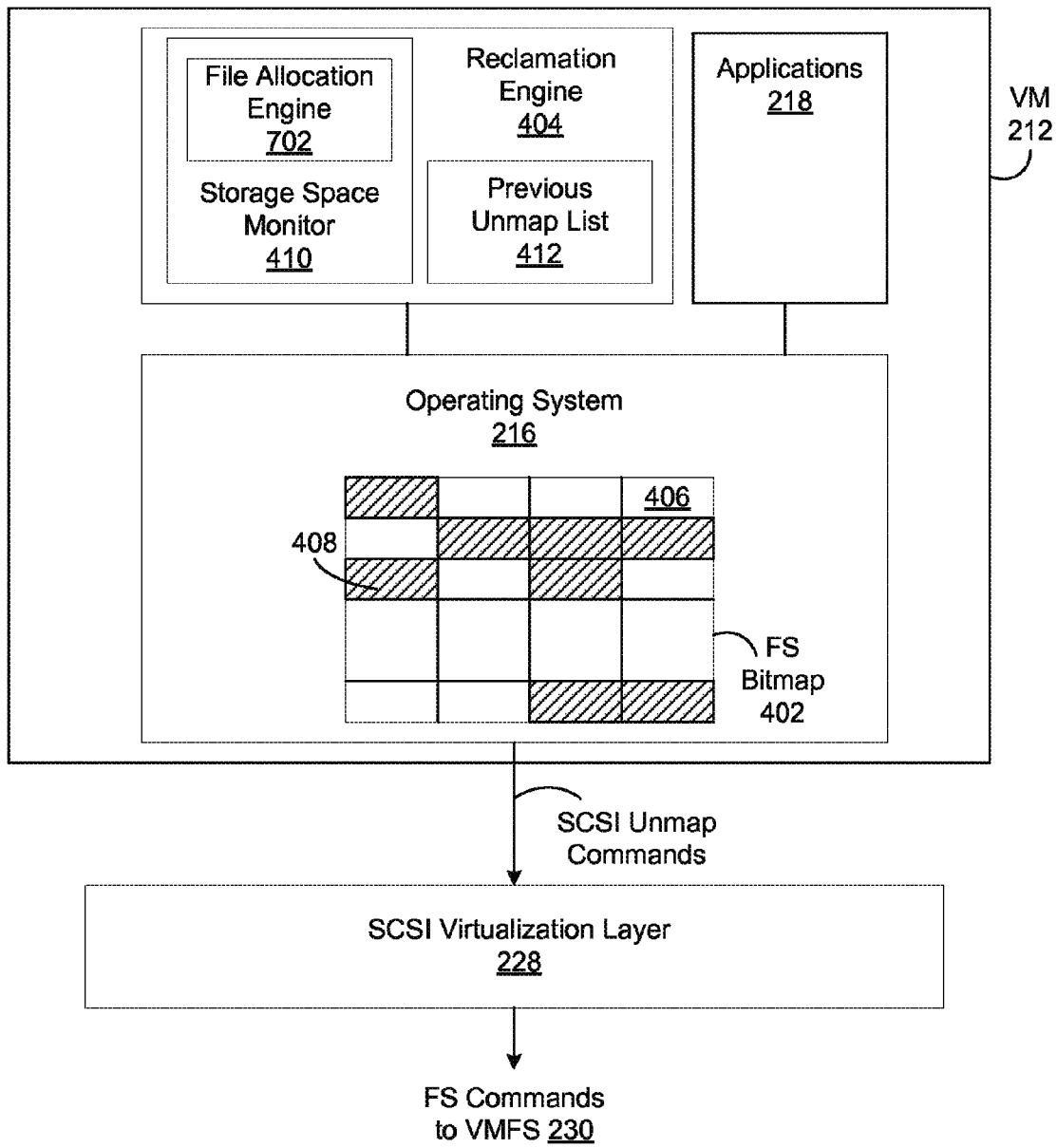
FIG. 7 illustrates a diagram of a reclamation engine within a virtual machine, according to another embodiment.
Figure 8:
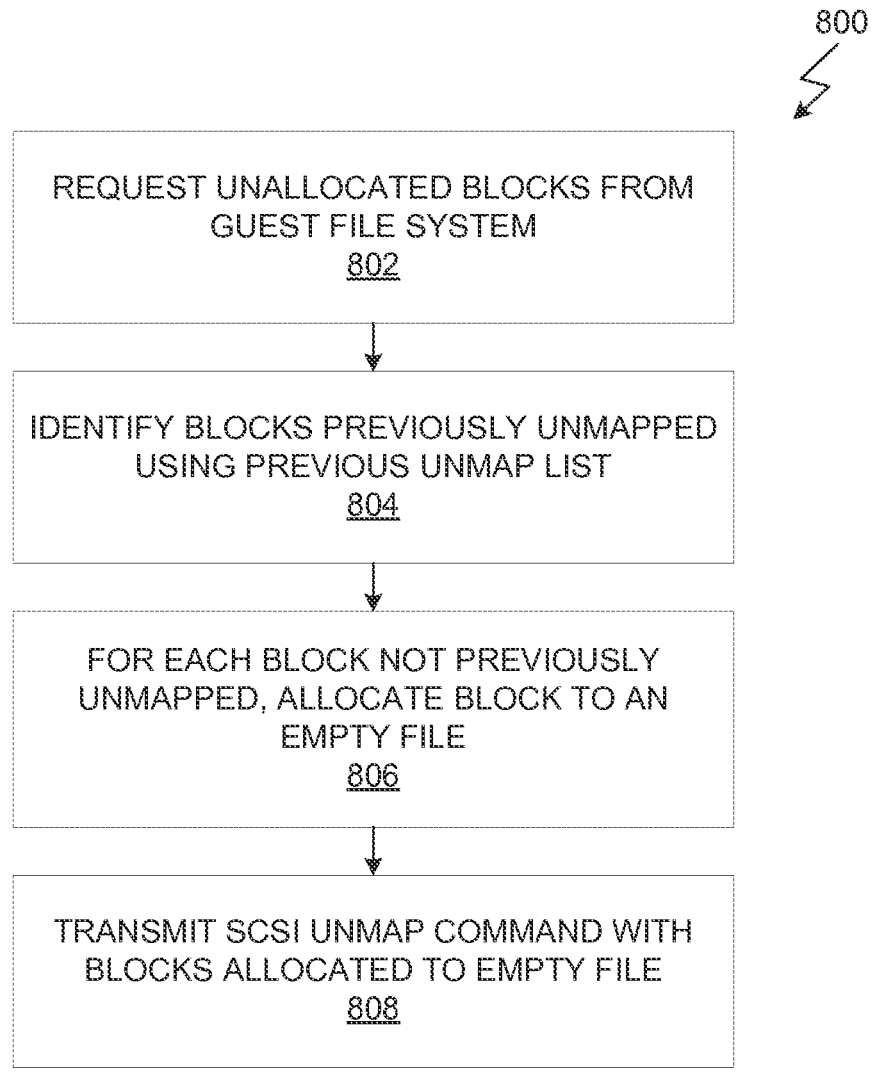
FIG. 8 is a flow diagram that illustrates a method of storage space reclamation that is initiated by a virtual machine utilizing a reclamation engine with a file allocation engine, according to one embodiment.

In a virtualization environment similar to that of FIG. 2, issuance of UNMAP commands by virtual machine $212_1$ to a virtual disk $222_A$ to release unused storage space back to its LUN can cause certain "race conditions" with write operations that are also issued by virtual machine $212_1$. In particular, because there are generally no guarantees regarding the ordering of transmitted SCSI-level block commands to virtual disk $222_A$ that are issued by different processes or applications 218 of virtual machine $212_1$, a write operation to a block in virtual disk $222_A$ that is issued by a first process in VM $212_1$ after an UNMAP command to the same block has been issued to virtual disk $222_A$ by a different process in VM $212_1$ actually may be processed by virtual disk $222_A$ before processing of the UNMAP command. Such a write operation may be issued after an UNMAP command when, for example, the guest file system notices that the block is free and allocates it to a file accessed by the first process which needs to write to the file (as stored within virtual disk $222_A$). In such a scenario, if virtual disk $222_A$ receives and processes the write operation before the UNMAP command, then the data written to virtual disk $222_A$ is lost when the UNMAP command is subsequently processed, resulting in data corruption. FIGS. 4-6 describe one embodiment of a system and techniques utilized by the system to address such race conditions. FIGS. 7-8 describe an alternative embodiment of a system and techniques used therein to address such race conditions.

FIG. 4 illustrates a diagram of a reclamation engine 404 within virtual machine $212_1$ of FIG. 2A, according to an embodiment. As depicted, reclamation engine 404 is a user-level application or process running on top of guest operating system 216 although it should be recognized that alternative embodiments may implement reclamation engine 404 within any component of VM $212_1$. Reclamation engine 404 includes a storage space monitor 410 and a previous UNMAP list 412. As also shown in the embodiment of FIG. 4 and as further detailed below, SCSI virtualization layer 228 of hypervisor 208 includes an UNMAP intent tracker 414 and an in-flight UNMAP tracker 416. UNMAP intent tracker 414 and in-flight UNMAP tracker 416 comprise data structures (and possibly executable logic in certain embodiments) that track the status of UNMAP commands and are utilized by hypervisor 208 to prevent data corruption that can occur due to race conditions when UNMAP commands and write operations are issued to the same block(s) by virtual machine $212_1$ to virtual disk $222_A$. Access to UNMAP intent tracker 414 and in-flight UNMAP tracker 416 is serialized such that only one context can be updating or querying these data structures at any given time.

As depicted, in order to interact with virtual disk $222_A$, which in one embodiment is implemented as a file (e.g., a .vmdk file, etc.) stored in a LUN provided by SAN 250, a guest file system of guest operating system 216 typically implements and utilizes a file system bitmap 402 or similar data structure, and each bit included in file system bitmap 402 indicates the availability of a particular file system block in the guest file system. For example, a data block corresponding to bit 406 is available while the data block corresponding to bit 408 is allocated to a file stored in virtual disk $222_A$.

In operation, when requiring additional guest file system data blocks, for example, to store additional data in a data file in virtual disk $222_A$, applications 218 executing in VM $212_1$ transmit requests to write to such a data file to the guest file system of guest operating system 216. In response to such requests, based on the block availability indicated by file system bitmap 402, the guest file system allocates available file system level data blocks, such as the data block corresponding to bit 406, to the data file of the requesting application by, for example, setting bit 406. When an application no longer needs an allocated data block (e.g., a word processing application deletes a temporary back-up file, etc.), the guest file system frees the allocated data block and makes it available for re-allocation to a different file by updating file system bitmap 204 by, for example, resetting bit 406 to zero. In such a scenario, however, the storage space allocated from the LUN to virtual disk $222_A$ that corresponds to the previously allocated block is not released by VMFS 230 from virtual disk $222_A$ back to the LUN. In embodiments where virtual disk $222_A$ is emulated as a thinly provisioned block device, an opportunity exists to release such storage space corresponding to the freed blocks from virtual disk $222_A$ back to the LUN (e.g., to be utilized by other virtual disks $222_N$ stored on the LUN) and subsequently dynamically allocate additional storage to virtual disk $222_A$ when needed. Without "reclaiming" of releasing such freed blocks in virtual disk $222_A$ back to the LUN, over time, the amount of actual storage space consumed by multiple virtual disks 222 in the LUN may continue to grow resulting in storage pressure experienced by the LUN.

FIG. 5 is a flow diagram that illustrates a method of storage space reclamation that is initiated by a virtual machine, according to one embodiment. Reclamation engine 404 is responsible for indicating to virtual disk $222_A$ when unused data blocks in the guest file system can be released back to the LUN. In one embodiment, at regular intervals, storage space monitor 410 included in reclamation engine 404 transmits a request to guest file system of guest operating system 216 for available data blocks included in the guest file system (see step 502). In response, based on file system bitmap 402, guest file system indicates to storage space monitor 410 that particular data blocks, such as the data block corresponding to bit 406, in the guest file system are available. Storage space monitor 410 then determines, based on previous UNMAP list 412, whether reclamation engine 404 may have previously issued an UNMAP command to virtual disk $222_A$ to release the identified data blocks back to the LUN (see step 504).

If reclamation engine 404 previously transmitted an UNMAP command to virtual disk $222_A$ to release an identified data block, then reclamation engine 404 does not perform any further operations on the identified data block. For those identified data blocks for which an UNMAP command was not previously issued to virtual disk $222_A$, reclamation engine 404 transmits a notification to virtual disk $222_1$ indicating an "intent' to transmit an UNMAP command for such data blocks (see step 506). In one embodiment, such an "intent-to-UNMAP notification" is implemented using existing SCSI commands, such as MODE SELECT, WRITE BUFFER, and WRITE ATTRIBUTE. In another embodiment, such an "intent-to-UNMAP notification" is implemented using a new SCSI command that is derived from existing SCSI commands, such as MODE SELECT, WRITE BUFFER, and WRITE ATTRIBUTE. In further embodiments, such an "intent-to-UNMAP notification" may be implemented using a special backdoor function call to hypervisor 208. Because virtual disk $222_A$ is implemented as a file in a LUN of SAN 250 and its logical behavior is emulated within hypervisor 208, in one embodiment, SCSI virtualization layer 228 of hypervisor 208 eventually receives the intent-to-UNMAP notification transmitted by reclamation engine 404 to virtual disk $222_A$ and, as further discussed below (e.g., in the context of FIGS. 6A and 6B), begins a "monitoring" process for incoming write operations to the same data blocks. Upon confirmation that virtual disk $222_A$ has received the intent-to-UNMAP notification, reclamation engine 404, again, transmits a request to guest operating system 216 to confirm that the identified data blocks are still available (see step 508). For those identified data blocks that guest operating system 216 indicates are no longer available (e.g., guest file system, in the intervening time between step 502 and step 508, allocated the data block to a requesting file or process), in one embodiment, reclamation engine 404 prunes such data blocks from the set of available identified data blocks (see step 510). For those identified data blocks that guest operating system 216 indicates are still available, reclamation engine 404 transmits an UNMAP command (or commands) associated with the identified data blocks to virtual disk $222_A$ (see step 512).

Figure 6A:
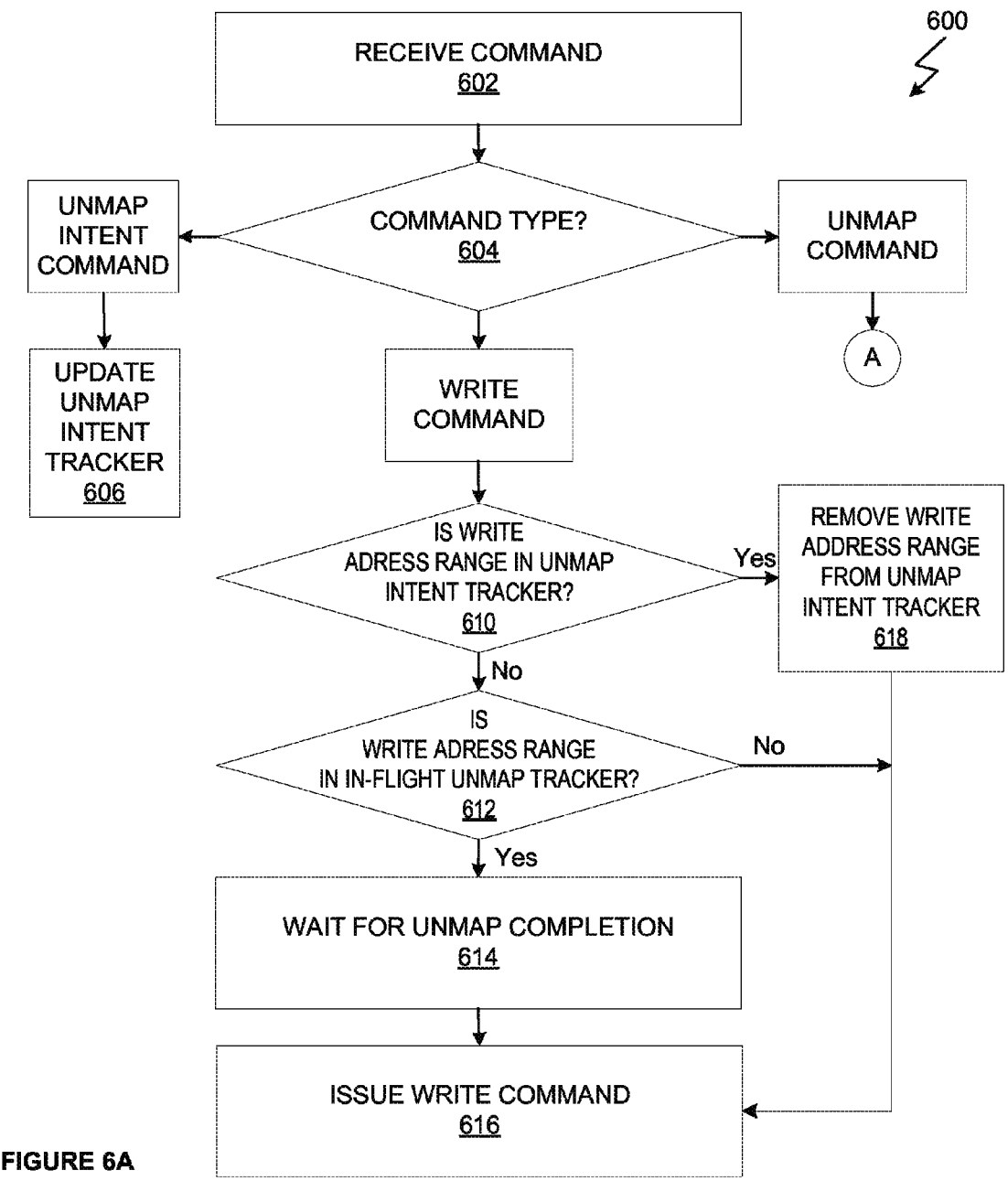
FIGS. 6A and 6B set forth a flow diagram that illustrate a method for processing commands received from a virtual machine for releasing storage space from a virtual disk back to underlying storage, according to one embodiment.
Figure 6B:
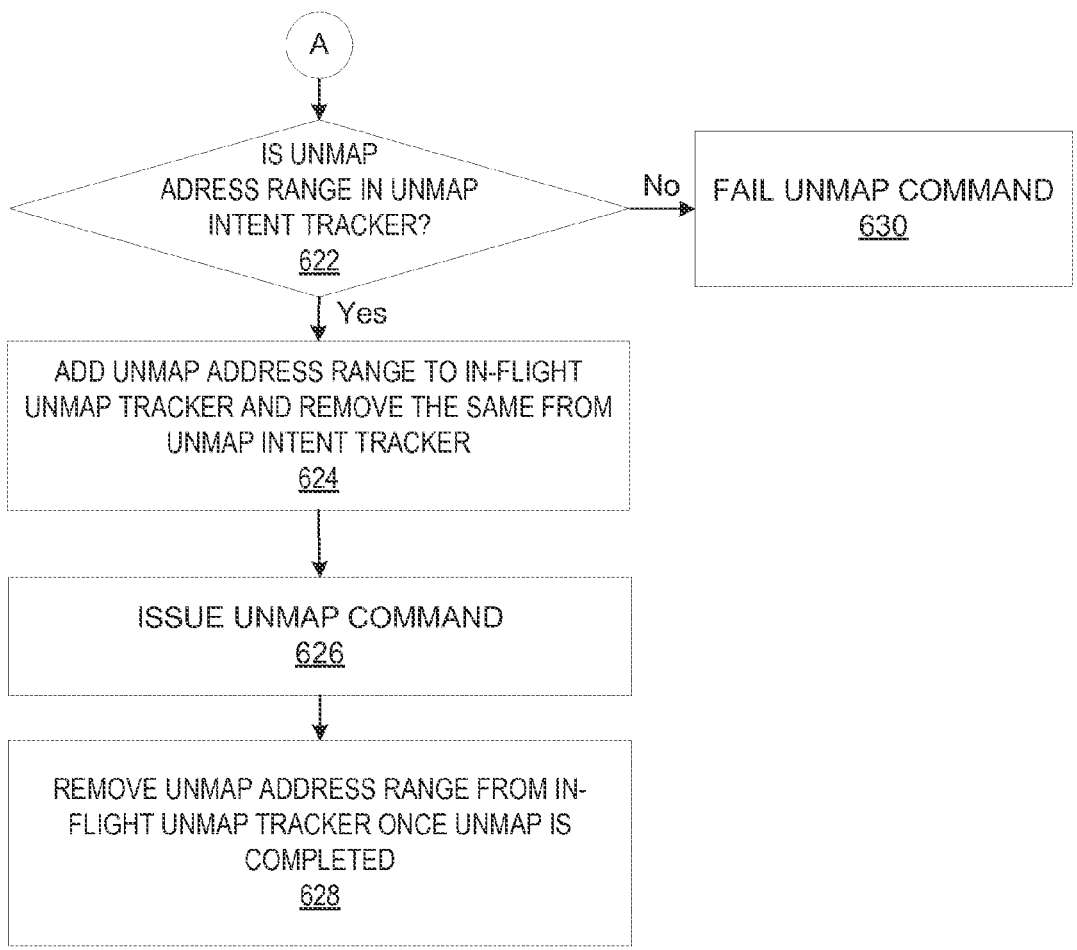

FIGS. 6A and 6B set forth a flow diagram that illustrate a method for processing commands (e.g., SCSI level commands) received from a virtual machine for releasing storage space from a virtual disk back to an underlying LUN, according to one embodiment. When, for example, reclamation engine 404 transmits an intent-to-UNMAP notification for certain data blocks as described in step 506 of FIG. 5, then hypervisor 208, at SCSI virtualization layer 228 and on behalf of virtual disk $222_A$, receives the notification in step 602 and, in step 604, identifies it as an intent-to-UNMAP notification (as opposed to a write operation or UNMAP command). As such, in step 606, hypervisor 208 records the data blocks (e.g., the LUN address ranges corresponding to such data blocks in one embodiment) in UNMAP intent tracker 414. In this manner, hypervisor 208 is able to keep track of potential upcoming UNMAP commands that may be later issued by reclamation engine 404, for example, in step 512 of FIG. 5 and prevent such UNMAP commands from corrupting an incoming write command as a result of the previously described race conditions.

When hypervisor 208 does receive an actual UNMAP command, for example, as is transmitted to virtual disk $222_1$ in step 512 of FIG. 5, then if hypervisor 208 determines in step 622 that the data blocks (e.g., LUN address ranges of the data blocks in one embodiment) corresponding to the UNMAP command have been recorded in UNMAP intent tracker 414, then, at step 624, hypervisor 208 adds the data blocks (e.g., the LUN address ranges of the data blocks) of the UNMAP command to in-flight UNMAP tracker 416 (i.e., to indicate that an UNMAP command relating to the data blocks is currently being performed) and removes the corresponding data blocks from UNMAP intent tracker 414. At step 626, hypervisor 208 issues the UNMAP command to VMFS 230, thereby requesting that VMFS 230, for example, release data blocks of the UNMAP command from a . vmdk file (or other similar file) of virtual disk $222_1$ back to the underlying LUN. Then, in step 628, hypervisor 208 removes the data blocks included in the UNMAP command from in-flight UNMAP tracker 416. Returning to step 622, if hypervisor 208 determines that the data blocks of the UNMAP command have not been recorded in UNMAP intent tracker 414, then in step 630, hypervisor 208 fails the UNMAP command.

The management of UNMAP intent tracker 414 and in-flight UNMAP tracker 416 by hypervisor 208, as discussed above, provides sufficient status information regarding UNMAP commands that are issued by reclamation engine 404 to enable hypervisor 208 to prevent data corruption due to race conditions when dealing with write operations issued by virtual machine $212_1$. For example, when virtual machine $212_1$ does issue a write operation to virtual disk $222_1$ (e.g., on behalf of one of applications 218), then in steps 602 and 604, hypervisor 208 identifies the received SCSI-level command as a write operation and, in step 610, determines whether the data blocks of the write operation have been recorded in UNMAP intent tracker 414. If not, then, at step 612, hypervisor 208 also checks whether the data blocks have been recorded in in-flight UNMAP tracker 416. If so, then an UNMAP command relating to the data blocks is currently being performed (e.g., by VMFS 230) and, at step 614, hypervisor 208 waits for the completion of the UNMAP command and, upon completion, in step 616, issues the write command to VMFS 230 (e.g., which may then dynamically allocate new LUN storage space to virtual disk $222_1$ for the data blocks, since the previous LUN storage space utilized by virtual disk $222_1$ for such data blocks was just released back to the LUN through the completed UNMAP command). Returning to step 610, if the data blocks of the write operation have been recorded in UNMAP intent tracker 414, in step 618, hypervisor 208 removes the data blocks from UNMAP intent tracker 414, effectively causing any subsequently received UNMAP command for the data blocks to fail (as previously described in steps 622 and 630) and then proceeds to step 616 to issue the write command to VMFS 230 (i.e., having now ensured that no upcoming UNMAP command will corrupt the write command). If there are no UNMAP commands associated with data blocks of the write operation, then hypervisor 208 will reach step 612 and proceed directly to step 616 to issue the write operation to VMFS 230.

As previously described, in one embodiment, storage space monitor 410 initiates operations related to storage space reclamation at regular intervals. In alternative embodiments, storage space monitor 410 may determine when to initiate operations related to storage space reclamation based on certain heuristics. The heuristics analyzed by storage space monitor 410 to make such a determination include storage space usage within the guest file system and/or the storage space usage within the LUN. For example, in one embodiment, storage space monitor 410 may utilize a "back door" or "back channel" to request storage space usage within the LUN directly from hypervisor 208. Over a given period of time, storage space monitor 410 records a high value and a low value of space usage in the guest file system. At certain time intervals, storage space monitor 410 requests the current usage of the guest file system from guest operating system 216 and then compares the current usage against the recorded high and low values to determine how much the usage of the guest file system has grown. Similarly, storage space monitor 410 determines, at each such interval, how much the usage of the physical storage space in the LUN has grown. When the usage of the guest file system has grown by a pre-determined amount and/or when the reported used space by the LUN exceeds the space reported by the guest file system by a given threshold, storage space monitor 410 performs the operations related to storage space reclamation.

In one embodiment, SCSI virtualization layer 228 "splits" an UNMAP command received from reclamation engine 404 that is associated with a specific portion of the LUN storage space based on the granulairty and alignment values determined in FIG. 3. In particular, if the specific portion of the LUN storage space associated with a particular UNMAP command does not fall within a particular partition of the LUN storage space, as specified by the granularity and the alignment values, then SCSI virtualization layer 228 modifies the UNMAP command to specify a sub-portion of the LUN storage space associated with the UNMAP command that falls within a particular partition of the physical storage space. In an alternate embodiment, reclamation engine 404 itself may perform such re-alignment based on the granularity and the alighment values such that the portion of the LUN storage space associated with the UNMAP command falls within a particular partition of the LUN storage space.

In yet another embodiment, the reclamation operations performed by reclamation engine 404 can be switched on or off based on the configuration characteristics of the virtual disks. For example, if a virtual disk has not been configured to be thinly provisioned or does not other support the UNMAP command, as determined in FIG. 3, then reclamation engine 404 cannot perform the reclamation operations via UNMAP commands. In such a scenario, the reclamation operations are switched off.

FIG. 7 illustrates a detailed diagram of a reclamation engine 404 within a virtual machine, according to another embodiment. As shown, in this embodiment, storage space monitor 410 of reclamation engine 404 further includes a file allocation engine 702 (as well as previous UNMAP list 412). As further discussed below, file allocation engine 702 is used to request the guest file system to allocate free data blocks to an "empty" file that is maintained by reclamation engine 404. Such a technique is generally referred to as "disk-ballooning." By having the guest file system allocate the free data blocks to such an empty file (thereby "un-freeing" the data blocks and marking the corresponding entries in file system bitmap 402 as used), file allocation engine 702 prevents any other applications 218 from accessing such data blocks for their own use, namely, perform write operations resulting in race conditions.

FIG. 8 is a flow diagram that illustrates a method of storage space reclamation that is initiated by a virtual machine utilizing a reclamation engine with a file allocation engine, according to one embodiment. Similar to reclamation engine 404 of FIG. 4, storage space monitor 410 also transmits a request to guest file system of guest operating system 216 for available data blocks included in the guest file system (e.g., step 802) and determines, based on previous UNMAP list 412, whether reclamation engine 404 may have previously issued an UNMAP command to virtual disk $222_A$ to release the identified data blocks back to the LUN (e.g., step 804). However, unlike the embodiment of reclamation engine 404 described in FIG. 5, for those identified data blocks for which an UNMAP command was not previously issued to virtual disk $222_A$, file allocation engine 702 utilizes a disk ballooning technique and transmits a request to the guest file system that the identified data blocks be allocated to the empty file maintained by reclamation engine 404 (e.g., step 806). Once the identified data blocks are allocated to the empty file maintained by reclamation engine 404, reclamation engine 404 transmits an UNMAP command (or commands) associated with the identified data blocks to virtual disk $222_A$ (e.g., 808). Since the identified data blocks are allocated to an empty file maintained by reclamation engine 404, no subsequent write commands corresponding to the identified data blocks can be issued by different processes or applications 218 of virtual machine $212_1$ that would result in race conditions. Therefore, in such an embodiment, SCSI virtualization layer 228 need not maintain a UNMAP intent tracker 414 or in-flight UNMAP tracker 416 as previously described in conjunction with the embodiments of FIGS. 4 and 5. In one embodiment that utilizes such a file allocation engine 702, the number of blocks allocated to the empty file maintained by reclamation engine 404 is limited to ensure that other that files in virtual disk $222_A$ accessed other applications 218 executing in virtual machine $212_1$ experience file system data block storage pressure. For example, file allocation engine 702 may determines number of available data blocks included in the guest file system and an UNMAP latency of the system (i.e., the amount of time taken for blocks of virtual disk $222_A$ to be released back to the the LUN once an UNMAP command is transmitted). Based on these two heuristics, file allocation engine 502 can determine a number of data blocks of the guest file systems to be unmapped (i.e., allocated to the empty file maintained by reclamation engine 404) given a certain rate of consumption (i.e., the rate at which data blocks are allocated to other applications executing within the virtual machine 2120.

Although one or more embodiments have been described herein in some detail for clarity of understanding, it should be recognized that certain changes and modifications may be made without departing from the spirit of the invention. For example, while some embodiments herein above describe techniques to reclaim space from thinly provisioned virtual disks back to the underlying LUN that store such virtual disks, it should be recognized that the same techniques described herein may be similarly utilized to reclaim space from thinly provisioned LUNs back to the SAN that allocated such LUNs. In one such embodiment, for example, the functions of reclamation engine 404 may be integrated into hypervisor 208 rather than as an application in a virtual machine. That is, hypervisor 208 (or any other operating system layer running at the physical computer level) could determine blocks that are unused by the LUN, for example, when files (. vmdk files for virtual disks, etc.) in the LUN are deleted, and transmit UNMAP commands to the SAN to release storage allocated to the LUN back to the SAN (e.g., so that such storage can be re-allocated to other LUNs, etc.). In such an embodiment, the race condition avoidance functionality of the SCSI virtualization layer 228 as described herein (e.g., UNMAP intent tracker, in-flight UNMAP tracker, etc.) would be implemented by the storage vender inside the SAN itself. Similarly, although embodiments herein have utilized a SAN, it should be recognized that any other storage device may be utilized, including for example, NAS devices that expose to servers an ability to transmit data transfer and control operations at the file level.

The various embodiments described herein may employ various computer-implemented operations involving data stored in computer systems. For example, these operations may require physical manipulation of physical quantities--usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system--computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments, may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

We claim:

1. A method of releasing free blocks of a logical block device back to an underlying disk-based storage system supporting the logical block device, comprising:
   identifying a set of the free blocks of the logical block device that are candidates to be released;
   updating the set of free blocks to remove those free blocks that have already been released from the logical block device;
   allocating the free blocks in the updated set to a file stored on the disk-based storage system; and
   issuing a command to the logical block device to release the free blocks allocated to the file from the logical block device.

2. The method of claim 1, further comprising:
   maintaining a data structure to track blocks for which the command to release has been issued; and
   updating the data structure to include the free blocks allocated to the file.

3. The method of claim 1, wherein the command is issued to a thinly provisioned disk.

4. The method of claim 3, wherein the thinly provisioned disk is a thinly provisioned virtual disk of a virtual machine, and the file is a file of the virtual machine.

5. The method of claim 1, wherein the command comprises a SCSI UNMAP command.

6. The method of claim 1, wherein the step of identifying the set of free blocks comprises:
   determining a number of free blocks in a file system of the logical block device;
   determining an UNMAP latency;
   wherein the set of free blocks is determined based on the number of free blocks and the UNMAP latency.

7. The method of claim 1, wherein the step of updating the set of free blocks comprises:
   identifying blocks to be released by a previously issued SCSI UNMAP command as the free blocks that have already been released from the logical block device.

8. A non-transitory computer readable storage medium comprising instructions executable in a computer system to cause the computer system to carry out a method of releasing free blocks of a logical block device back to an underlying disk-based storage system supporting the logical block device, comprising:
   identifying a set of the free blocks in a file system of the logical block device that are candidates to be released;
   updating the set of free blocks to remove those free blocks that have already been released from the file system of the logical block device;
   allocating the free blocks in the updated set to a file stored on the disk-based storage system; and
   issuing a command to the logical block device to release the free blocks allocated to the file from the logical block device.

9. The non-transitory computer readable storage medium of claim 8, wherein the method further comprises:
   maintaining a data structure to track blocks for which the command to release has been issued; and
   updating the data structure to include the free blocks allocated to the file.

10. The non-transitory computer readable storage medium of claim 8, wherein the command is issued to a thinly provisioned disk.

11. The non-transitory computer readable storage medium of claim 10, wherein the thinly provisioned disk is a thinly provisioned virtual disk of a virtual machine, and the file is a file of the virtual machine.

12. The non-transitory computer readable storage medium of claim 8, wherein the command comprises a SCSI UNMAP command.

13. The non-transitory computer readable storage medium of claim 8, wherein the step of identifying the set of free blocks comprises:
   determining a number of free blocks in the file system of the logical block device;
   determining an UNMAP latency;
   wherein the set of free blocks is determined based on the number of free blocks and the UNMAP latency.

14. The non-transitory computer readable storage medium of claim 8, wherein the step of updating the set of free blocks comprises:
   identifying blocks to be released by a previously issued SCSI UNMAP command as the free blocks that have already been released from the logical block device.

15. A system, comprising:
   a disk-based storage system supporting a logical block device; and
   a hardware platform configured to execute a virtualization layer to release free blocks of the logical block device back to the disk-based storage system supporting the logical block device by:
      identifying a set of the free blocks in a file system of the logical block device that are candidates to be released;
      updating the set of free blocks to remove those free blocks that have already been released from the file system of the logical block device;
      allocating the free blocks in the updated set to a file stored on the disk-based storage system; and
      issuing a command to the logical block device to release the free blocks allocated to the file from the logical block device.

16. The system of claim 15, wherein the hardware platform is further configured to execute the virtualization layer to:
   maintain a data structure to track blocks for which the command to release has been issued; and
   update the data structure to include the free blocks allocated to the file.

17. The system of claim 15, wherein the command is issued to a thinly provisioned disk.

18. The system of claim 17, wherein the thinly provisioned disk is a thinly provisioned virtual disk of a virtual machine, and the file is a file of the virtual machine.

19. The system of claim 15, wherein the hardware platform is further configured to execute the virtualization layer to:
   determine a number of free blocks in the file system of the logical block device;
   determine an UNMAP latency;
   wherein the set of free blocks is determined based on the number of free blocks and the UNMAP latency.

20. The system of claim 15, wherein the hardware platform is further configured to execute the virtualization layer to:
   identify blocks to be released by a previously issued SCSI UNMAP command as the free blocks that have already been released from the logical block device.

* * * * *